Inventors.
Herbert Berg, &
Josef Fischer.

United States Patent Office 2,807,760
Patented Sept. 24, 1957

2,807,760

PIVOTAL MOUNTING OF ELECTROMAGNETICALLY OPERATED ARMATURE ELEMENTS OR THE LIKE

Herbert Berg and Josef Fischer, Munich, Germany, assignors to Siemens & Halske Aktiengesellschaft, Munich and Berlin, Germany, a corporation of Germany Application March 21, 1955, Serial No. 495,377
In Germany October 1, 1948

Public Law 619, August 23, 1954
Patent expires October 1, 1968

4 Claims. (Cl. 317—198)

This invention is concerned with a journal device for pivotally mounting electromagnetically operated elements such as relay armatures or movable operating elements in measuring instruments or the like.

It is known to use in such devices a tensioned striplike spring subjected to torsion. Known devices, for example, relays, use for the mounting of the corresponding spring strip a diecast aluminum frame which is fastened on a structural part by means of screws. The frame is relatively small and light, accordingly not very stable, and may easily shift laterally, thereby altering the adjustment of the torsion spring. This is particularly true in view of the fact that the frame is fastened only on one side while the other side hangs free. The unfastened side of the frame can therefore shift responsive even to a slight lateral touch, disturbing the adjustment of the relay. There is moreover in the known tensioning or mounting frames no possibility of control for the magnitude of the pulling force acting upon the torsion spring. This force may accordingly become so low that insufficient tension is imparted to the spring or it may be so great that the permissible tension on the spring is exceeded. This latter condition is particularly detrimental in the case of very thin torsion springs such as they are frequently required.

The invention provides for the mounting of the torsion spring a frame comprising or adjusting screw forming at least one side of such frame. The tension applied to the torsion spring is adjustable by the screw. The frame is weakened on the side opposite the setting screw, the corresponding weakened area or portion acting upon adjustment of the setting screw in the manner of a pivot.

The above indicated and other objects and features of the invention will appear from the description which will be rendered below with reference to the accompanying drawing showing in diagrammatic manner embodiments thereof.

Figure 1:
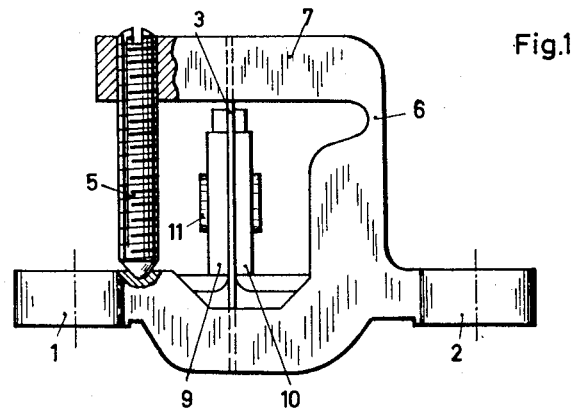
Fig. 1 is an elevational view of an embodiment of the new journal mounting for a relay armature or the like, showing the armature in end view.
Figure 2:
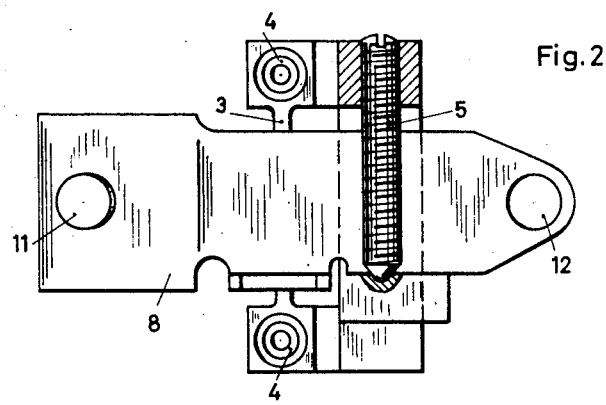
Fig. 2 is a similar elevational view of the structure of Fig. 1 showing the armature in plan view.

The mounting according to Figs. 1 and 2 comprises a generally U-shaped tensioning frame, for example, a die cast frame having a base and two arms extending therefrom substantially in parallel relationship. The frame may be suitably fastened on the associated device, for example, on a relay, at the points 1 and 2. A torsion spring 3 is in known manner riveted to the arms of the frame by means of rivets 4. At the open side of the frame, between the two arms, is disposed a setting screw 5 which engages a screw thread in the arm 7. The free or inner end of the screw can thus be displaced relative to the other arm of the frame, by turning the screw, for the purpose of adjusting the tension of the spring 3 as desired. A notch is formed in the opposite side of the frame, that is, in base thereof, to weaken such base throughout a portion 6. This weakened portion acts upon adjustment of the screw in the manner of a pivot for the arm 7. The armature, forming an operating member of the structure, may be fastened to the spring in known and suitable manner. The armature may, for example, comprise two metal sheet pieces 9 and 10 disposed on the sides of the torsion spring and riveted together by rivets such as indicated at 11 and 12.

Figure 3:
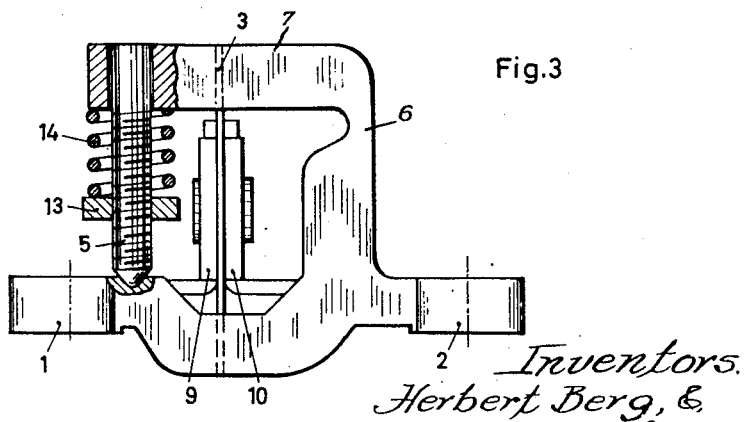
Fig. 3 shows a modification.

In order to counteract fatigue of the frame and/or the torsion spring, another spring may be added, for example, as shown in Fig. 3. The adjusting or setting screw 5 is in this case disposed generally as before but is not in threaded engagement with the arm 7 of the frame, its corresponding end extending through a bore in such arm. The screw 5 carries a nut 13 and a compression spring 14 is disposed between the nut 13 and the frame arm 7. Manipulation of the nut 13 will more or less compress the spring 14, thereby placing a corresponding force on the arm 7 and tensioning the torsion spring accordingly.

Changes may be made within the scope and spirit of the following claims.

We claim:

1. In electric apparatus having a movable electromagnetically operable element and a torsion spring coacting with said element, a device for mounting said torsion spring, said device comprising a frame having two arms extending in spaced substantially parallel relationship, means for securing the opposite ends of said torsion spring to said arms, and movable threaded means extending between said arms for adjusting the spacing therebetween to adjust the tension of said torsion spring.

2. The structure and cooperation of parts as defined in claim 1, comprising a generally U-shaped frame forming said arms to which is secured said torsion spring, a screw constituting said threaded adjusting means, said screw cooperating with said arms.

3. The structure and cooperation of parts as defined in claim 1, comprising a generally U-shaped frame forming said arms to which is secured said torsion spring, a screw constituting said threaded adjusting means, said screw cooperating with said arms, a notch being formed in the base of said frame which extends opposite said screw to weaken said base for a predetermined portion thereof, said weakened portion acting as a pivot for the displacement of an arm of said bracket responsive to actuation of said screw.

4. The structure and cooperation of parts as defined in claim 1, comprising a screw constituting said threaded adjusting means, a nut carried by said screw, and a compression spring disposed between said nut and one of said arms for compressing said spring to transmit tensioning force to said arms for the purpose of tensioning said torsion spring.

References Cited in the file of this patent

UNITED STATES PATENTS 2,526,685     Price  ---------------- Oct. 24, 1950

FOREIGN PATENTS 175,931     Austria  -------------- Aug. 25, 1953